(12) United States Patent
Nakayasu

(10) Patent No.: US 6,337,979 B1
(45) Date of Patent: Jan. 8, 2002

(54) PDC (PERSONAL DIGITAL CELLULAR) COMMUNICATION CONTROLLING APPARATUS AND SYSTEM THEREOF

(75) Inventor: Kanada Nakayasu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/106,102

(22) Filed: Jun. 29, 1998

(30) Foreign Application Priority Data

Jun. 30, 1997 (JP) .............................................. 9-174328

(51) Int. Cl.[7] ................................................. H04Q 7/20
(52) U.S. Cl. ....................... 455/426; 455/560; 455/554; 379/225; 370/347
(58) Field of Search ................................. 455/426, 554, 455/555, 561, 562, 462; 370/314, 337, 360, 377; 379/225

(56) References Cited

U.S. PATENT DOCUMENTS

| | | | | |
|---|---|---|---|---|
| 4,639,914 A | * | 1/1987 | Winters ....................... | 455/552 |
| 5,157,660 A | * | 10/1992 | Kuwahara et al. .......... | 370/314 |
| 5,323,446 A | * | 6/1994 | Kojima et al. ............... | 455/437 |
| 5,742,640 A | * | 4/1998 | Haoui et al. ................. | 375/220 |
| 5,818,918 A | * | 10/1998 | Fujii ........................... | 379/167 |
| 5,889,767 A | * | 3/1999 | Kimura ....................... | 371/314 |

FOREIGN PATENT DOCUMENTS

| | | |
|---|---|---|
| JP | 2-237263 | 9/1990 |
| JP | 6-22360 | 1/1994 |
| JP | 409238101 A | * 9/1997 |

OTHER PUBLICATIONS

Webopedia.com, Webopedia Definitions and Links', ADPCM, page 1, Dec. 1999.*
PHS MoU Newsletter, www.phsmou.or.jp, 'Recent TTC Activities Concerning PHS Standards', issue 4, pp. 1–3, Jun. 2000.*
PHS MoU Newsletter, www.phsmou.or.jp, 'Elaboration of PHS Technical Standards', issue 7, pp. 1–10, Dec. 1999.*

* cited by examiner

Primary Examiner—Dwayne Bost
Assistant Examiner—Charles Craver
(74) Attorney, Agent, or Firm—Young & Thompson

(57) ABSTRACT

A PDC communication controlling apparatus includes an audio processing section for converting a digital audio signal which has been encoded at a transmission rate of a personal digital cellular (PDC) into a digital audio signal at a transmission rate of a digital exchange network, a small radio base station controlling section accommodating a plurality of small radio base stations which are connected to PDC portable terminal units through radio circuits and which have different radio cover areas, the small radio base station controlling section managing the radio cover areas of the PDC portable terminal units, controlling calls, and controlling and managing the radio circuits, a network-side adaptor used in non-audio communications with the PDC portable terminal units, a PDC/network interface section connected to a private branch exchange through a plurality of communication paths, a time division switch for connecting the PDC/network interface, the audio processing section, the radio base station controlling section and the network-side adaptor and for switching the connection state thereof under the control of the small radio base station controlling section on time division basis.

6 Claims, 6 Drawing Sheets

PDC (PERSONAL DIGITAL CELLULAR) COMMUNICATION CONTROLLING APPARATUS AND SYSTEM THEREOF

BACKGROUND OF THE INVENTION

1. Field of the Invention

The present invention relates to a communication controlling apparatus in a local area radio system using a PDC (Personal Digital Cellular) portable terminal unit, in particular, to an audio/non-audio PDC communication controlling apparatus that is connected to a private branch exchange (PBX), that has the same service as a public PDC system, and that provides the service of the PBX.

2. Description of the Related Art

As the number of subscribers to digital portable telephone systems drastically increases, various new services are required. In addition, analog or digital telephone units used in offices and so forth require complicated wiring connections. Thus, fixed telephone units are inconvenient. To solve such problems, radio telephone systems have been constructed.

FIG. 6 is a schematic diagram showing the structure of a conventional radio telephone system as disclosed in Japanese Patent Laid-Open Publication No. Hei6-22360.

In the related art reference shown in FIG. 6, the radio telephone system is composed of a radio terminal unit 617 and a radio terminal unit controlling unit 600. The radio terminal unit controlling unit 600 is connected to a private branch exchange (PBX) or the like (not shown).

The radio terminal unit controlling unit 600 comprises a radio terminal unit communication portion 615, a controlling portion 601, an exchange communication portion 604, a two-wire/four-wire converting portion 610, a hook relay switch 608, a dial relay switch 609, and a selecting switch 611. A modular jack 619 can be used for both a two-wire type interface and a four-wire type interface of the PBX. With two-wire type signal lines 605-R, the radio terminal unit controlling unit 600 is connected to the PBX. A bell detecting portion 607 detects a bell signal received from one of the signal lines 605-R through a capacitor 606. The controlling portion 601 generates a trigger signal. A DTMF (Dual Tone Multi-Frequency) signal generator 612 generates a DTMF signal. The selecting switch 611 selects the trigger signal or the DTMF signal and outputs the selected signal to the PBX or the like.

When an origination call, a termination call, a dialing signal, display data, and so forth are sent and received to/from the PBX, the controlling portion 601 controls the exchange communication portion 604. Such data is transmitted to the radio terminal unit 617 through the radio terminal unit communication portion 615 and an antenna 616.

An audio band signal is sent to the PBX through the radio terminal unit communication portion 615, the two-wire/four-wire converting portion 610, and the modular jack 619.

The controlling portion 601 causes the radio terminal unit communication portion 615 to autonomously search a radio frequency free of an external interference and determine an operation frequency. In addition, the controlling portion 601 causes the radio terminal unit 617 to select a channel through the radio terminal unit communication portion 615.

In other words, according to the related art reference, the controlling portion 601 determines whether or not the interface of the PBX is two-wire type or four-wire type, adaptively converts an audio band signal received from the radio terminal unit 617 into a particular signal, and autonomously determines an operation signal, thereby suppressing the operation frequency from interfering another unit and from being interfered by another unit. However, the radio terminal unit 617 of the system should be disposed in a radio cover area of the radio terminal unit controlling unit 600 accommodated in the PBX.

Thus, in the local area radio system composed of the PBX, the small radio base station, and the radio terminal unit, since communications are available only in the radio cover area of the radio base station accommodated in the PBX, the usability of the system is low.

In addition, since it is difficult to exchange a control signal among a plurality of terminal unit controlling units, while a radio terminal unit is moving, a user thereof cannot communicate to another user.

Moreover, due to the system structure, it is difficult to share the system with a non-audio communication (such as FAX and data communication) and an audio communication.

SUMMARY OF THE INVENTION

The present invention is made from the above-described point of view. An object of the present invention is to provide a PDC communication controlling apparatus that has the following features. A PDC portable telephone terminal unit instead of a conventional wired telephone unit used in an office is used in a local area radio system that will be increasingly used year after year. Thus, the PDC portable telephone terminal unit is used as an office telephone unit that has an extension communication function with high mobility. A plurality of PDC portable telephone terminal units can be connected to the PBX. Each PDC portable telephone terminal unit can transmit not only an audio band signal, but a non-audio signal (such as FAX and data). While a PDC portable telephone terminal is moving, it can transmit both an audio signal and a non-audio signal as with a conventional public PDC system. Moreover, services of the PBX are provided. Thus, the usability of a PDC portable telephone terminal unit can be further improved.

A first aspect of the present invention is a PDC communication controlling apparatus, comprising an audio processing means for converting a digital audio signal that has been encoded at a transmission rate of a personal digital cellular (PDC) into a digital audio signal at a transmission rate of a digital exchange network, a small radio base station controlling means accommodating a plurality of small radio base stations that are connected to PDC portable terminal units through radio circuits and that have different radio cover areas, the small radio base station controlling means managing the radio cover areas of the PDC portable terminal units, controlling calls, and controlling and managing the radio circuits, a network-side adaptor used in non-audio communications with the PDC portable terminal units, a PDC/network interface means connected to a private branch exchange through a plurality of communication paths, a time division switch for connecting the PDC/network interface, the audio processing means, the radio base station controlling means, and the network-side adaptor and for switching the connection state thereof under the control of the small radio base station controlling means on time division basis, wherein the small radio base station controlling means separates the PDC/network interface means from the network-side adaptor in the case that a termination call is an audio communication, places the network-side adaptor between the PDC/network interface means and the audio processing means in the case that the termination call is a non-audio communication, and loops back the communication path for an extension communication in the case that the termination call is a communication performed between the PDC portable terminal units.

A second aspect of the present invention is a PDC communication controlling apparatus, comprising an audio processing means for converting a digital audio signal that has been encoded at a transmission rate of a personal digital cellular (PDC) into a digital audio signal at a transmission rate of a digital exchange network, a plurality of small radio base stations having different radio cover areas, a small radio base station controlling means, connected to the small radio base stations, for managing the radio cover areas of PDC portable terminal units, controlling calls, and controlling and managing radio circuits, a network-side adaptor used in non-audio communications with the PDC portable terminal units, a PDC/network interface means connected to a private branch exchange through a plurality of communication paths, a time division switch for connecting the PDC/network interface, the small radio base station controlling means, and the network-side adaptor and for switching the connection state thereof under the control of the small radio base station controlling means on time division basis, wherein the small radio base station controlling means separates the PDC/network interface means from the network-side adaptor in the case that a termination call is an audio communication, places the network-side adaptor between the PDC/network interface means and the small radio base station controlling means in the case that the termination call is a non-audio communication, and loops back the communication path for an extension communication in the case that the termination call is a communication performed between the PDC portable terminal units.

The audio processing means preferably converts an audio signal that has been encoded at a transmission rate of 11.2 kbps, 7.05 kbps, or 3.675 kbps on the PDC side into an ADPCM (Adaptive Differential Pulse Code Modulation) audio signal at a transmission rate of 32 kbps on the digital exchange network side.

Thus, the audio processing means decodes and converts a PDC audio signal at a transmission rate of 11.2 kbps (full rate), 7.05 kbps (half rate), or 3.675 kbps (high efficiency) that has been encoded by a PDC portable terminal unit into an ADPCM signal at a transmission rate of 32 kbps. The resultant signal is sent to the PDC/network interface means by the time division switch. The signal is sent to the PBX through the PDC/network interface means. The PDC/network interface means can directly interface with the PBX. In other words, the PDC portable terminal unit can be connected as an extension unit to the PBX without need to modify the PBX. The PBX detects a destination telephone number from the signal received from the PDC portable terminal, sets a communication path to an external line or an extension line, and calls the telephone unit on the destination side (in the case that the PDC portable terminal unit originates a call).

At this point, the small radio base station (BS) and the radio circuit are controlled by the small radio base station (BS) controlling means. The PDC communication controlling apparatus handles a control signal on the control channel D ch different from the communication channel B ch.

At this point, the small radio base station (BS) controlling means manages the radio cover area of the PDC portable terminal unit and the frequency of the small radio base station. In the PDC communication controlling apparatus, the PDC portable terminal unit can be handed over.

The small radio base station (BS) converts the PDC control signal format into the network control signal format beforehand. The PDC communication controlling apparatus operates corresponding to the network control signal format.

When a non-audio communication (such as FAX/data) is performed, the audio processing means does not perform the encoding/decoding process, but directly send a non-audio signal to the time division switch. The time division switch detects a non-audio signal corresponding to a command received from the small radio base station (BS) controlling means and places the network-side adaptor (modem) in the communication path corresponding to the data type. The network-side adaptor (modem) has a function for terminating the PDC non-audio protocol and converting it into the network-side FAX/data communication protocol or vice versa (T.30, V42. bis etc.).

Thus, the PDC portable terminal unit can be disposed in the radio cover area of the PDC communication controlling apparatus. With the PDC portable terminal unit and the PBX, a local area radio system can be accomplished. In addition, the PDC portable terminal unit can have both services of the public PDC system and the PBX.

These and other objects, features and advantages of the present invention will become more apparent in light of the following detailed description of a best mode embodiment thereof, as illustrated in the accompanying drawings.

DESCRIPTION OF PREFERRED EMBODIMENTS

Figure 1:
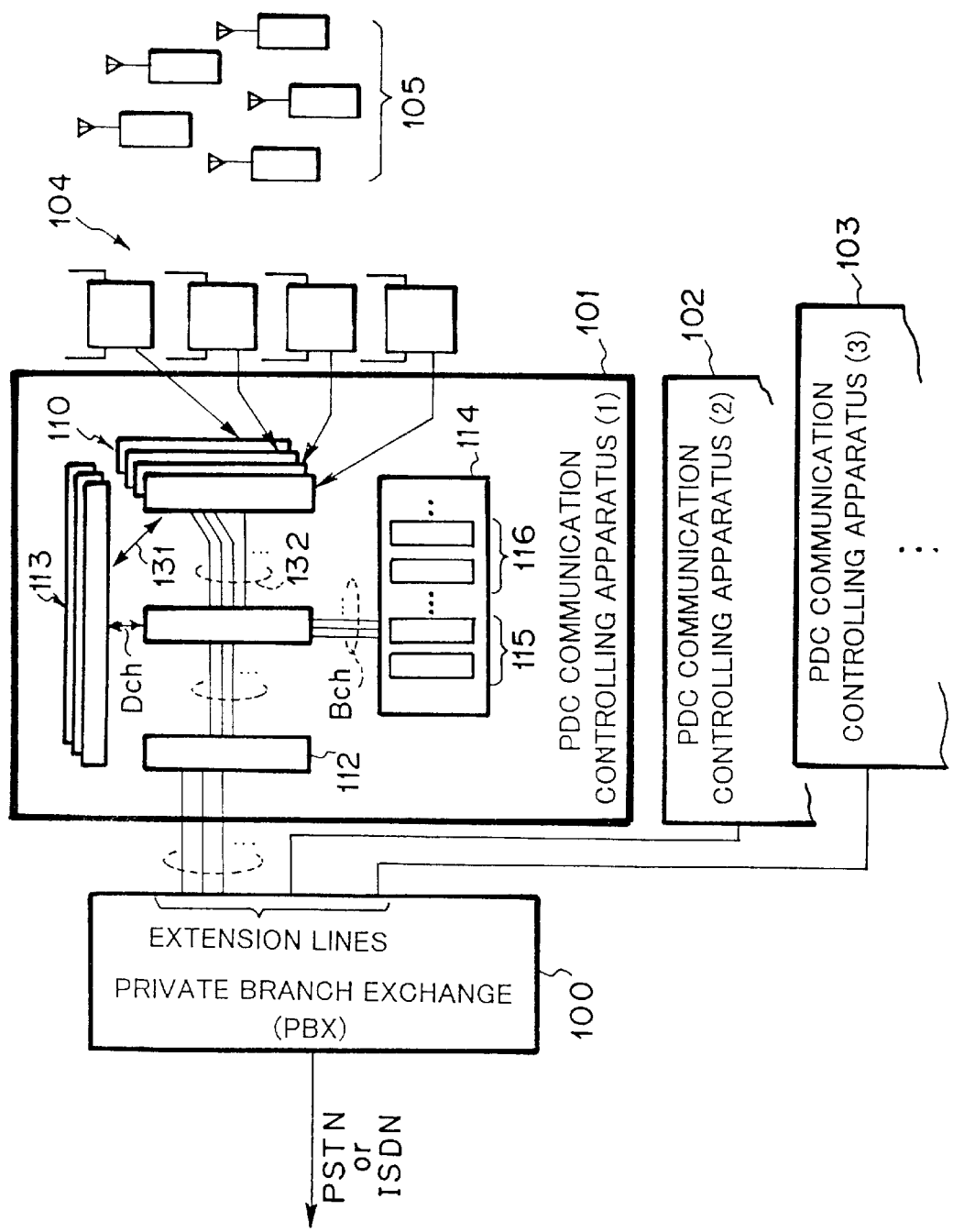
FIG. 1 is a schematic diagram showing the structure of a preferred embodiment of the present invention.

FIG. 1 is a schematic diagram showing the structure of a system according to an embodiment of the present invention. Referring to FIG. 1, reference numeral 100 is a private branch exchange (PBX). Reference numerals 101, 102, and 103 are PDC communication controlling apparatuses. Reference numeral 104 is a group of small radio base stations. Reference numeral 105 is a group of PDC portable terminal units.

In this embodiment, a predetermined number of PDC communication controlling units can be accommodated to the PBX 100. In other words, the PBX 100 treats all PDC portable terminal units that are in radio cover areas of the PDC communication controlling units 101, 102, and 103 accommodated in the PBX 100 as extension units thereof. In FIG. 1, reference numeral 110 is a group of audio processing means. Reference numeral 111 is a time division switch. Reference numeral 112 is a PDC/network interface means. Reference numeral 113 is a group of small radio base stations (BS) controlling means. Reference numeral 114 is a group of network-side adaptors (modems). Reference numeral 115 is a group of FAX adaptors in the group of network-side adaptors 114. Reference numeral 116 is a group of data communication adaptors. Reference numeral 131 is a D channel data bus for exchanging a control signal between the group of small radio base station (BS) controlling means 113 and the group of small radio base stations (BS) 104 or the group of PDC portable terminal units 105. Reference numeral 132 is a B channel data bus for sending an audio signal or a non-audio signal.

The group of small radio base stations 104, the group of PDC terminal units 105, the group of audio processing means 110, the group of small base station controlling means 113, the group of network-side adaptors 114, the group of FAX adaptors 115, and the group of data communication adaptors 116 are composed of a plurality of small radio base stations, a plurality of PDC terminal units, a plurality of audio processing means, a plurality of small base station controlling means, a plurality of network-side adaptors, a plurality of FAX adaptors, and a plurality of data communication adaptors, respectively. However, in the following description, for simplicity, a single small radio base station 104, a single PDC terminal unit 105, an audio processing means 110, a single small base station controlling means 113, a single network-side adaptor 114, a single FAX adaptor 115, and a single data communication adaptor 116 will be described.

The number of small radio base stations (BS) 104 and the number of PDC portable terminals that can be accommodated in the audio processing means 110, the small radio base station (BS) controlling means 113, and the network-side adaptor (modem) 114 are predetermined. However, depending on an application, the number of PDC portable terminals accommodated in these means becomes large. In this case, a plurality of audio processing means 110, a plurality of small radio base station (BS) controlling means 113, and a plurality of network-side adaptors (modems) 114 are required.

In addition, when the number of PDC portable terminal units 105 becomes large, a plurality of PDC communication controlling apparatuses may be used. In FIG. 1, as an example, two PDC communication controlling apparatuses 102 and 103 are disposed.

Next, the operation of the system according to the embodiment shown in FIG. 1 will be described.

The operation frequency of the small radio base station (BS) 104 should be free from external interference. For example, when a plurality of small radio base stations (BS) 104 are adjacently disposed, the operation frequencies thereof may interfere with each other. To prevent such interference, the small radio base station (BS) controlling means 113 of the PDC communication controlling apparatus 101 manages the operation frequencies of all the small radio base stations (BS) 104 accommodated thereto. In addition, each small radio base station (BS) 104 has a transmitting/receiving antenna and detects interference corresponding to a data error ratio of the receiving portion. The small radio base station (BS) controlling means 113 has a blank frequency management table (not shown). With reference to the blank frequency management table, the small radio base station (BS) controlling means 113 manages the operation frequencies of the small radio base stations (BS) 104.

Figure 2:
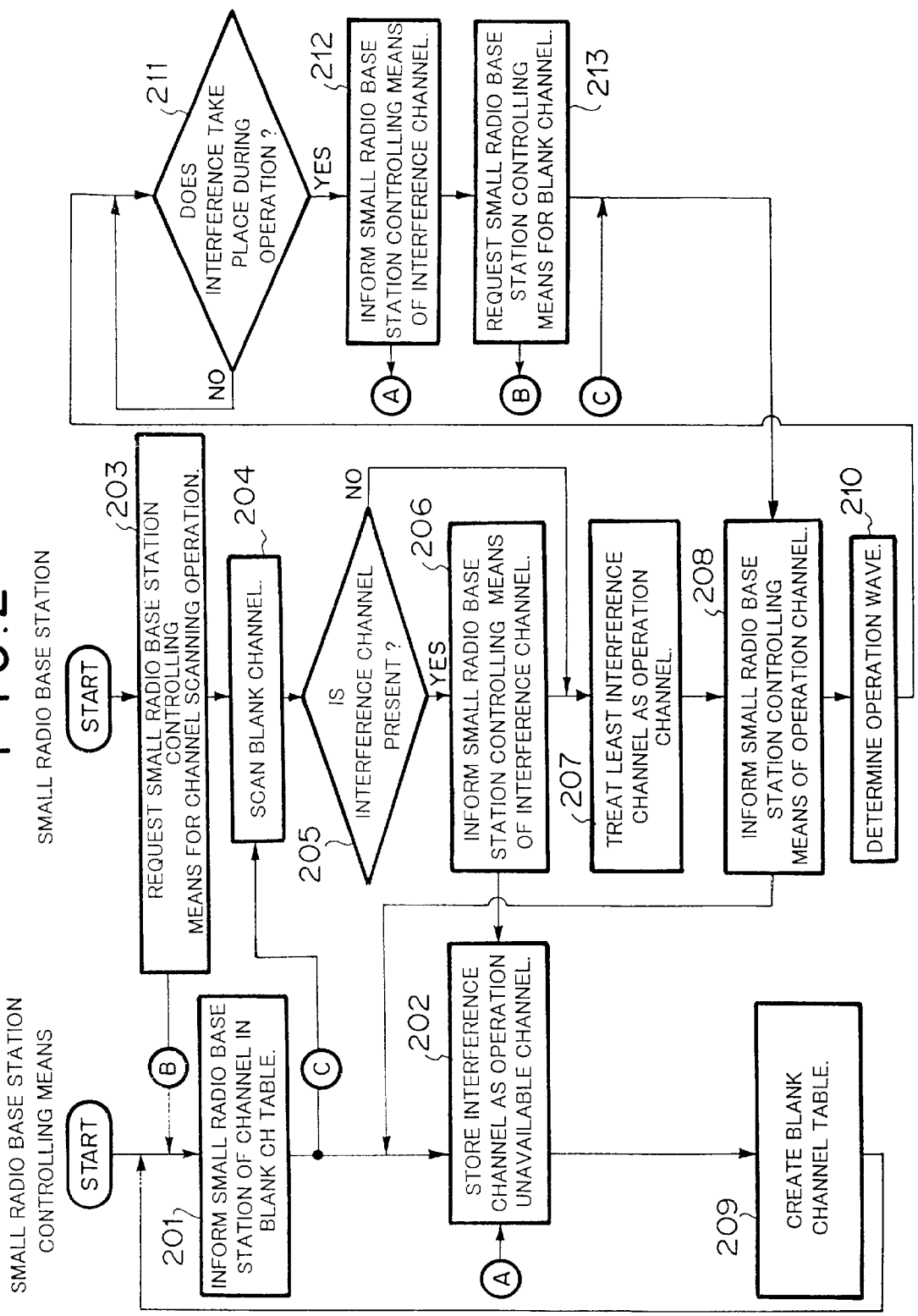
FIG. 2 is a flow chart showing a radio circuit operation frequency determining process of a small radio base station (BS) controlling means 113.

FIG. 2 is a flow chart showing the operations of the small base station (BS) controlling means 113 and the small base station (BS) 104. Next, with reference to FIG. 2, the operation of the system according to the embodiment shown in FIG. 1 will be described.

When the operation of the small radio base station (BS) 104 is started, it requests the small radio base station (BS) controlling means 113 to perform a channel scanning operation for blank frequency information (at step S203). Thus, the small radio base station (BS) controlling means 113 performs the channel scanning operation and informs the small radio base station (BS) 104 of the blank frequency information (at step S201).

The small radio base station (BS) 104 scans all frequencies corresponding to the received blank frequency information (at step S204) and determines whether or not interference waves are present at individual frequencies (at step S205). When an interference wave is present at a scanned frequency (namely, the determined result at step S205 is Yes) (at step S205), the small radio base station (BS) 104 informs the small radio base station (BS) controlling means 113 of the frequency at which an interference wave is present (at step S206). The small radio base station (BS) 104 designates a channel on which the interference wave is the weakest as an operation channel (at step S207), informs the small radio base station (BS) controlling means 113 of the designated channel (at step S208), and determines the operation wave (at step S210).

The small radio base station (BS) controlling means 113 stores the informed frequency as an operation unavailable frequency (at step S202) and modifies the blank frequency table (at step S209).

When the small radio base station (BS) 104 has detected an interference wave (at step S211), it informs the small radio base station (BS) controlling means 113 of the interference frequency (at step S212) and requests the small radio base station (BS) controlling means 113 for a blank frequency (at step S213).

Thus, the small radio base station (BS) controlling means 113 searches an optimum blank frequency from the blank frequency table in the same manner as step S201 and informs the small radio base station (BS) 104 of the searched frequency. The small radio base station (BS) 104 operates at the received blank frequency as the operation frequency and informs the small radio base station (BS) controlling means 113 of the operation frequency (at step S208).

Thus, the small radio base station (BS) controlling means 113 modifies the blank frequency table corresponding to the informed operation frequency. Information is exchanged between the small radio base station (BS) controlling means 113 and the small radio base station (BS) 104 on the D channel 131.

When an audio signal is communicated, the audio processing means 110 converts an encoded audio signal at a transmission rate of 11.2 kbps, 7.05 kbps, or 3.675 kbps on the PDC side into an ADPCM audio signal at a transmission rate of 32 kbps on the network side or vice versa. When a call is transmitted to an external line or a call is transmitted to an extension line in the PBX, the time division switch 111 sets a communication path to the PBX through the PDC/network interface means 112 so as to send an ADPCM audio signal.

When a call is transmitted between PDC portable terminal units accommodated in the same PDC communication controlling apparatus, the time division switch 111 loops back the communication path so as to accomplish an extension communication in the PDC communication controlling apparatus 101. When an audio signal is communicated, the network-side adaptor (modem) 114 is not connected.

When a non-audio signal is communicated, the audio processing means 110 does not perform the audio process, but directly sends the non-audio signal to a predetermined portion corresponding to a command received from the small radio base station (BS) controlling means 113. However, in this case, the audio processing means 110 converts the non-audio signal at a transmission rate of 11.2 kbps on the PDC side into the signal at a transmission rate of 32 kbps on the network side.

Likewise, corresponding to a command received from the small radio base station (BS) controlling means 113, the time division switch 111 is controlled so that the network-side adaptor (modem) is placed on the communication path.

The small radio base station (BS) controlling means 113 manages the radio cover area of the PDC portable terminal units 105 accommodated thereto. In the case that after a communication between a particular small radio base station (BS) 104 and a particular PDC portable terminal unit 105 is interrupted, the particular PDC portable terminal unit 105 transmits a communication request to another small radio base station (BS) 104, the small radio base station (BS) controlling means 113 detects the communication request, restores the communication path of the particular PDC portable terminal unit 105, and causes the time division switch 111 to set a new communication path. Thus, the call can be handed over (namely, the call is not disconnected, but resumed).

Figure 3:
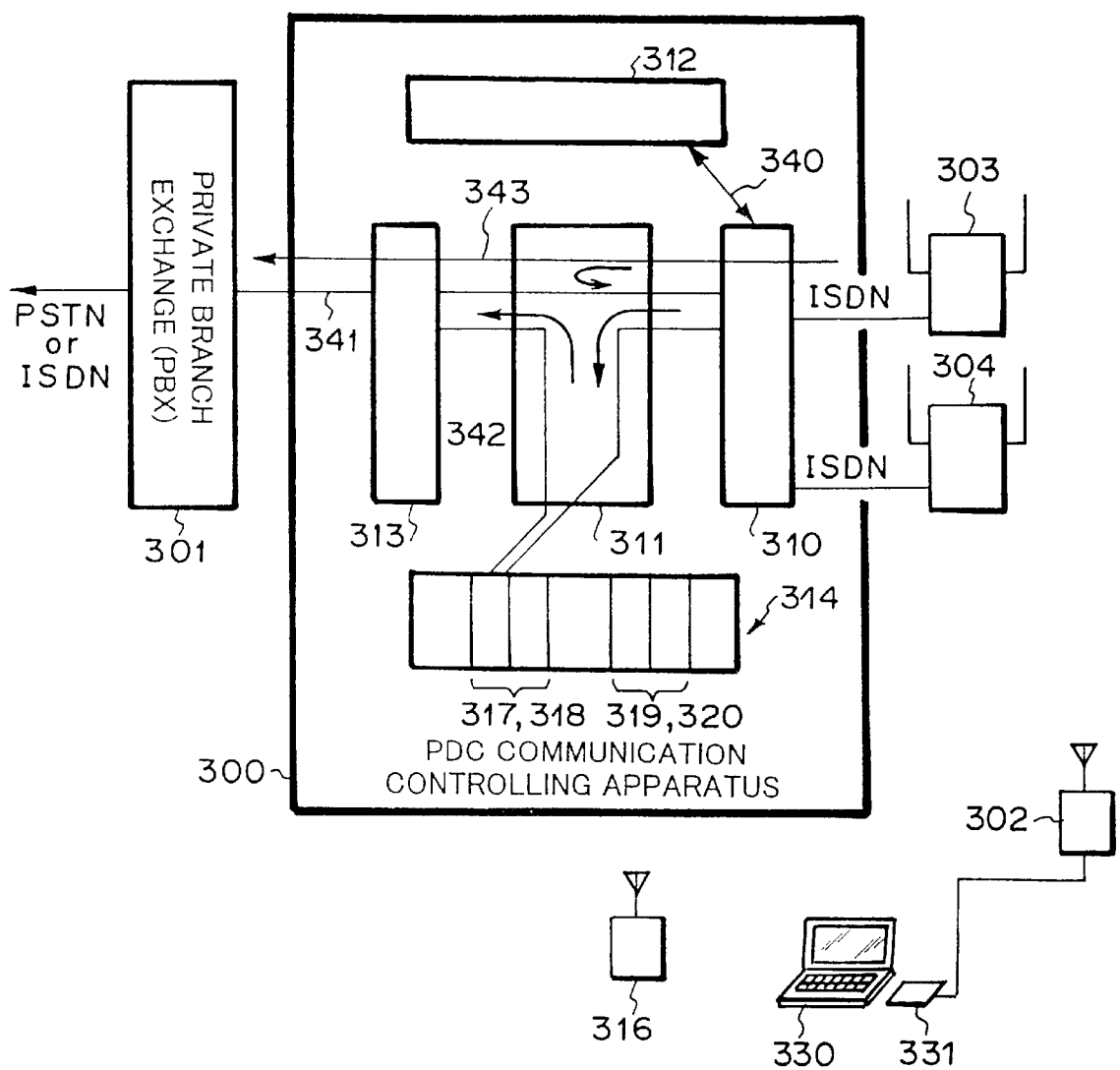
FIG. 3 is a schematic diagram showing the structure of another embodiment of the present invention.

FIG. 3 is a schematic diagram showing the structure of a system according to an embodiment of the present invention.

Referring to FIG. 3, reference numeral 300 is a PDC communication controlling apparatus. Reference numeral 301 is a private branch exchange (PBX). Reference numeral 302 is a PDC mobile terminal unit. Reference numerals 303 and 304 are PDC small radio base stations (BS).

The embodiment shown in FIG. 1 is the maximum structure of the present invention, while the embodiment shown in FIG. 3 is the minimum structure thereof. The radio circuit format of the PDC small radio base stations (BS) 303 and 304 is a time division system having time slots 0 to 5. The time slots 2 and 5 of each small radio base station (BS) are used for control channels on which a control signal is transmitted/received between a PDC portable terminal unit 302 and a PDC communication controlling apparatus 300.

An audio processing means 310 in the PDC communication controlling apparatus 300 can accommodate two small radio base stations (BS) 303 and 304. Each PDC communication controlling apparatus 300 can control up to eight (4×2=8) audio communications. The small radio base stations (BS) 303 and 304 and the PDC communication controlling apparatus 300 are connected with an ISDN circuit.

Reference numeral 311 is a time division switch that selects a communication path for an audio signal or a communication path for a non-audio signal. Reference numeral 312 is a small radio base station (BS) controlling means that controls the radio circuits of the small radio base stations (BS) 303 and 304, calls, and the radio cover area of the PDC portable terminal unit 302. Reference numeral 313 is a PDC/network interface means. Reference numeral 314 is a network-side adaptor (modem) used for a non-audio communication. The network-side adaptor 314 has FAX adaptors 317 and 318 and data communication adaptors 319 and 320. Adaptors are disposed corresponding to individual non-audio communication services. Each adaptor is assigned one communication path.

The PDC/network interface means 313 in the PDC communication controlling apparatus 300 connects the PBX 301 and the PDC communication controlling apparatus 300 without need to modify the PBX 301. Reference numeral 330 is a personal computer used in a non-audio communication. Reference numeral 331 is a card modem for a PDC portable terminal unit. The card modem 331 is connected to the personal computer 330. The card modem 331 controls a PDC non-audio protocol with the network-side adaptor (modem) 314 through the PDC portable terminal unit 302.

Figure 4:
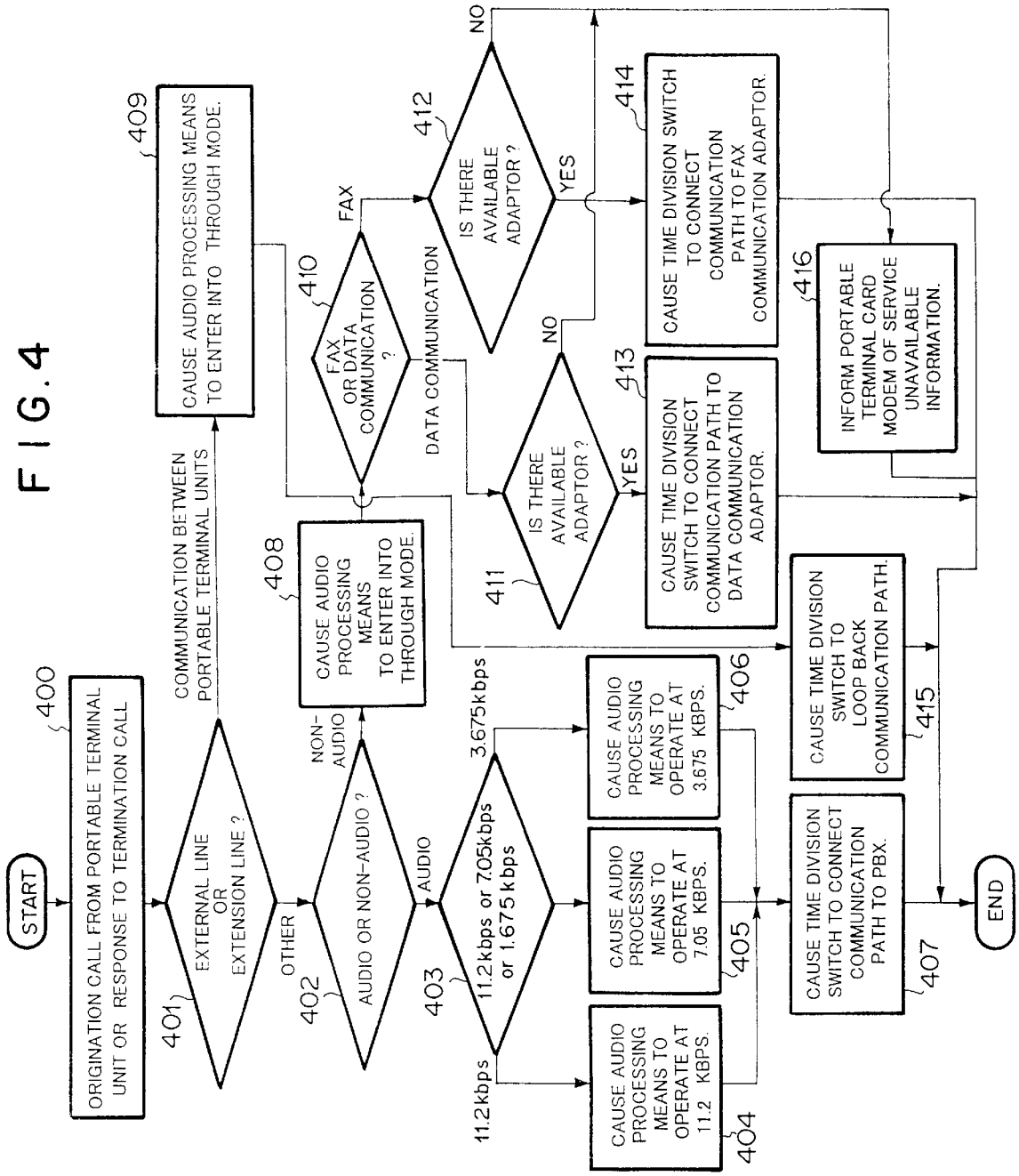
FIG. 4 is a flow chart showing a control process of a small radio base station (BS) controlling means 312.

FIG. 4 is a flow chart showing the control operation of the small radio base station (BS) controlling means 312 that controls both an audio communication and a non-audio communication. Next, with reference to FIG. 4, the control operation will be described.

When the power of the small radio base station (BS) 303 is turned on, a frequency free from an interference wave is selected in the process shown in FIG. 2. The selected frequency is used as an operation frequency of the small radio base station (BS) 303.

When the PDC portable terminal unit 302 acquires the operation frequency, it exchanges a control signal with the small radio base station (BS) controlling means 112 and enters into a standby state. In other words, the PDC portable terminal unit 302 is placed in the radio cover area of the small radio base station (BS) 303. Thus, the PDC portable terminal unit 302 enters into a standby state. In other words, the radio cover area of the PDC portable terminal unit 302 is managed by the small radio base station (BS) controlling means 312 accommodated in the PDC communication controlling apparatus 300.

When the PDC portable terminal unit 302 originates a call, a control signal corresponding to the PDC protocol is transmitted to the small radio base station (BS) 303 through the time slots 2 and 5 of the radio circuit.

The small radio base station (BS) 303 converts the control signal corresponding to the PDC protocol into a control format corresponding to the network protocol. The resultant signal is sent to the small radio base station (BS) controlling means 312 through the audio processing means 310 and the ISDN D channel 340 (at step S400).

The small radio base station (BS) controlling means 312 detects a destination telephone number of a call originated by the PDC portable terminal unit 302 and determines whether the designation of the call is an external line, an analog telephone unit in the PBX 301, a digital telephone unit therein, or a PDC portable terminal unit 316 in the radio cover area of the small radio base station (BS) 312 (at step S401). When the call is a communication between the PDC portable terminals 302 and 316, the small radio base station (BS) controlling means 312 causes the audio processing means 310 to enter into the through mode regardless of whether the call is an audio communication or a non-audio communication (at step S409). In addition, the small radio base station (BS) controlling means 312 causes the time division switch 311 to loop back the communication path (at step S415).

Thus, the audio processing means 310 does not perform the audio process, but directly sends/receives the signal to a predetermined portion. When the call is not a communication performed between the PDC portable terminal units 302 and 316, the small radio base station (BS) controlling means 312 determines whether the call is an audio communication or a non-audio communication (at step S402). When the call is an audio communication, the small radio base station (BS) controlling means 312 determines whether the format of the radio circuit (transmission rate) is 11.2 kbps, 7.05 bps, or 3.675 bps (at step S403). Depending on the format of the radio circuit, the audio process performed by the audio processing means 310 varies. Thus, the small radio base station (BS) controlling means 312 causes the audio processing means 310 to perform the process corresponding to the determined format of the radio circuit (at steps 404 to S406). The audio processing means 310 performs the audio process corresponding to the required format of the radio circuit.

Thereafter, the small radio base station (BS) controlling means 312 sends required call control information to the PBX through the PDC/network interface means 313. In addition, the small radio base station (BS) controlling means 312 causes the time division switch 311 to open the communication path 314 to the PBX 301 (at step S407). The time division switch 311 connects the communication path corresponding to the command received from the small radio base station (BS) controlling means 312. The PBX 301 connects a different communication path depending on whether the destination of the call is an external line, an analog telephone unit in the PBX 301, or a digital telephone unit in the PBX 301.

The above-described operation is performed in the case that the destination telephone number of the call is a telephone number of an external line or a telephone number accommodated in the PBX 301 and that the call is an audio communication. On the other hand, when the call is a non-audio communication as the determined result at step S402, the small radio base station (BS) controlling means 312 causes the audio processing means 310 to enter into the through mode (at step S408) and determined whether or not the non-audio communication is a FAX communication or a data communication (at step S410). Since the network-side adaptor (modem) 314 has FAX adaptors 317 and 318 and data communication adaptors 319 and 320 corresponding to service types and each adaptor is assigned one communication path, the network-side adaptor (modem) 314 can accommodate non-audio communications corresponding to the number of adaptors.

When the non-audio communication is a FAX communication as the determined result at step S410, the small radio base station (BS) controlling means 312 determines whether or not there is an available adaptor (at step S412). When there is an available adaptor, the small radio base station (BS) controlling means 312 informs the time division switch 311 that the call is a FAX communication and causes the time division switch 311 to connect a relevant communication path to the FAX adaptors 317 and 318 of the network-side adaptor (modem) 314 (at step S414).

When the non-audio communication is a data communication as the determined result at step S410, the small radio base station (BS) controlling means 312 determines whether there is an available adaptor (at step S411). When there is an available adaptor, the small radio base station (BS) controlling means 312 informs the time division switch 311 that the call is a data communication so as to cause the time division switch 311 to connect a relevant communication path to the data communication adaptors 319 and 320 of the network-side adaptor (modem) 314 (at step S413).

The small radio base station (BS) controlling means always monitors whether or not the network-side adaptor (modem) 314 is being used. When there is no available adaptor at steps S411 and S412, the small radio base station (BS) controlling means 312 informs the PDC portable terminal unit 302 or the PDC portable terminal card modem 331 through the small radio base station (BS) 303 of service unavailable information (at step S416).

When the call is received from an external line or a telephone unit accommodated in the PBX 301, the small radio base station (BS) 303 converts a signal corresponding to the protocol of the external line or the telephone unit in the PBX 301 into a signal corresponding to the protocol of the PDC and terminates the call to the PDC portable terminal unit 302. As with the origination call of the PDC portable terminal unit 302, the small radio base station (BS) 312 determines the radio circuit format corresponding to the protocol of the PDC and controls the audio processing means 310. When the call is a non-audio communication, the small radio base station (BS) controlling means 312 causes the audio processing means 310 to connect the network-side adaptor (modem) 314. When the call is an audio communication, the small radio base station (BS) controlling means 312 causes the audio processing means 310 to disconnect the network-side adaptor (modem) 314.

Figure 5:
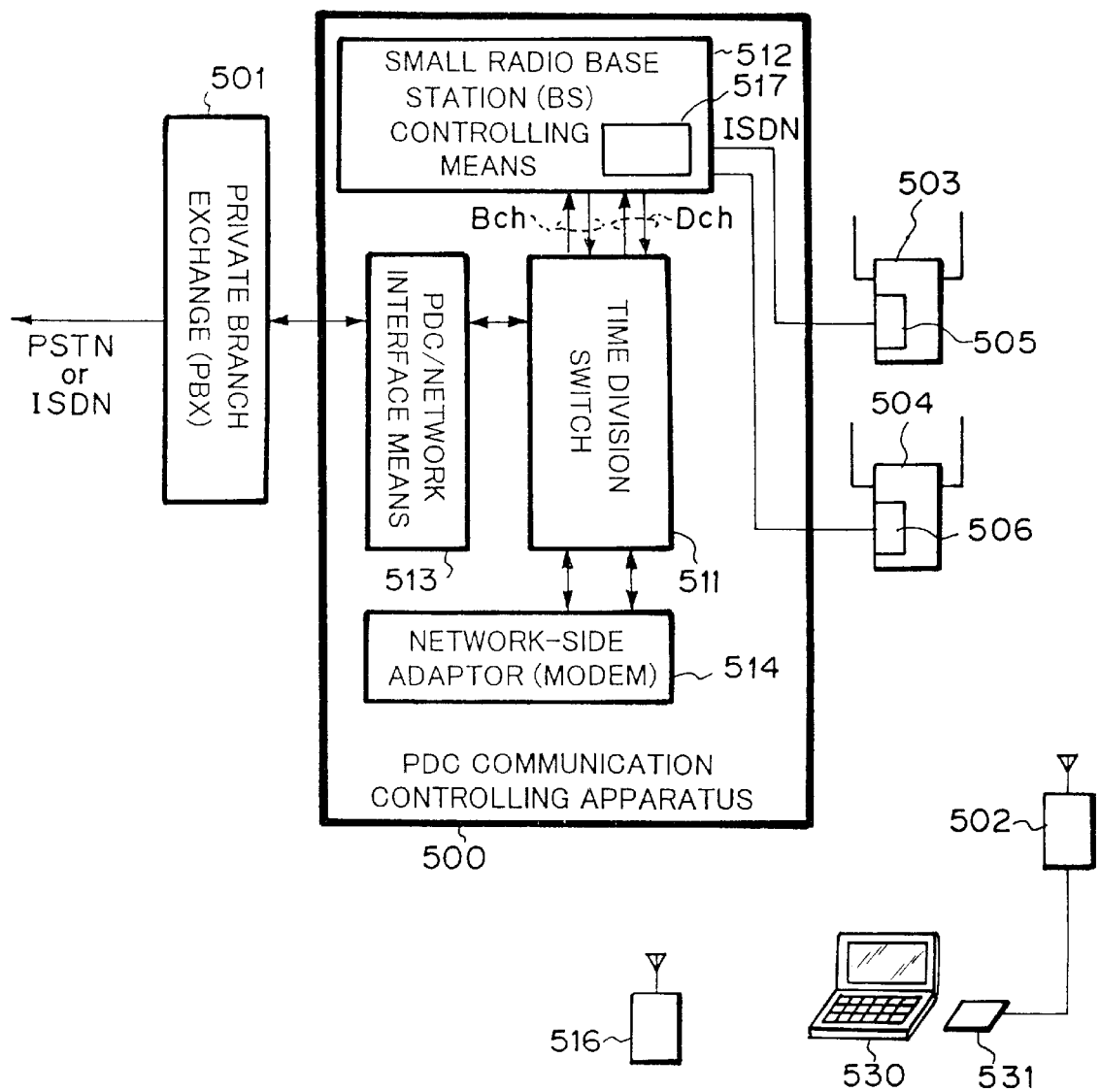
FIG. 5 is a schematic diagram showing the structure of another embodiment of the present invention.
Figure 6:
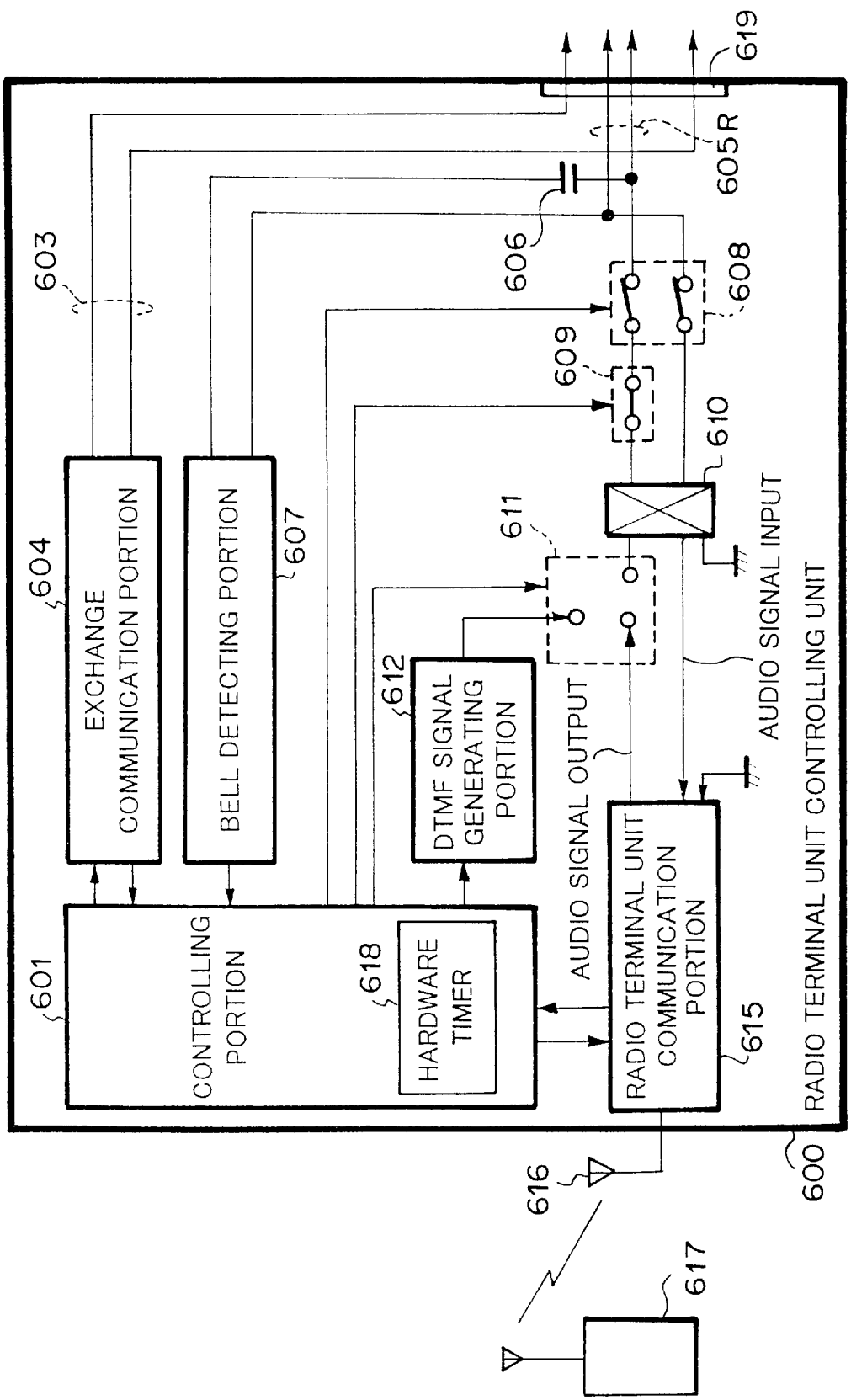
FIG. 6 is a schematic diagram showing the structure of a related art reference.

FIG. 5 is a schematic diagram showing the structure of a system according to another embodiment of the present invention.

As with the embodiment shown in FIG. 3, the system shown in FIG. 5 comprises a PDC communication controlling apparatus 500, a private branch exchange (PBX) 501, and small radio base stations 503 and 504. Likewise, the PDC communication controlling apparatus 500 comprises a small radio base station (BS) controlling means 512, a PDC/network interface means 513, a time division switch 511, and a network-side adaptor (modem) 514. In this embodiment, instead of the audio processing means 310 shown in FIG. 3, audio processing means 505 and 506 are disposed in the small radio base stations (BS) 503 and 504, respectively. The small radio base station (BS) controlling means 512 has an ISDN interface means 517 that separates or combines an audio/non-audio signal on a B channel and a control signal on a D channel. The functions and operations of a PDC portable terminal unit 502, a personal computer 530, a card modem 531, and a PDC portable terminal unit 516 are the same as those of the PDC portable terminal unit 302, the personal computer 330, the card modem 331, and the PDC portable terminal unit 316 shown in FIG. 3, respectively.

According to the embodiment shown in FIG. 5, the structure of the PDC communication controlling apparatus can be simplified. In the embodiment shown in FIG. 3, the small radio base station (BS) controlling means 312 controls the audio processing means 310, the time division switch 311, the radio cover areas of the PDC mobile terminal units 302 and 316, and the small radio base stations (BS) 303 and 304. However, in the structure shown in FIG. 5, since the control of the audio processing means can be omitted, the process of the small radio base station (BS) controlling means 512 can be alleviated.

As described above, the present invention has the following effects.

As a first effect of the present invention, with the PDC communication controlling apparatus, a control signal corresponding to a PDC protocol can be converted into a control signal corresponding to a network protocol or vice versa. A PDC audio signal can be encoded or decoded to/from an ADPCM signal at a transmission rate of 32 kbps. With a FAX/data communication adaptor connected to a PDC portable terminal unit, a signal corresponding to a non-audio protocol on the PDC side can be converted into a signal corresponding to a non-audio protocol on the network side. Thus, a non-audio communication can be accomplished. An audio communication path can be switched to a non-audio communication path or vice versa. In addition, since the radio cover areas of PDC portable terminal units are managed, various functions such as a hand-over function of PDC portable terminal units accommodated in the same PDC communication controlling apparatus or the same private branch exchange (PBX) can be accomplished.

Thus, almost the same functions as a public PDC system can be accomplished. When the PDC communication controlling apparatus and the small radio base station (BS) are disposed in a building or a factory, PDC portable terminal units used in the public PDC system are accommodated in the PDC communication controlling apparatus, the same service as the public PDC system can be accomplished. In addition, as with a conventional local area radio system and an office telephone system, the PDC portable terminal units can be used as extension terminal units of the PBX.

As a second effect of the present invention, when the audio processing means group, the network-side adaptor group, and the small base station (BS) controlling means group are disposed in the PDC communication controlling apparatus according to the present invention, the structure of the small radio base stations (BS) disposed in various places such as buildings and factories can be simplified. Thus, the PDC communication controlling apparatus can be easily disposed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A PDC communication controlling apparatus, comprising:
   audio processing means for converting a digital audio signal which has been encoded at a transmission rate of a personal digital cellular (PDC) into a digital audio signal at a transmission rate of a digital exchange network;
   small radio base station controlling means accommodating a plurality of small radio base stations which are connected to PDC portable terminal units through radio circuits and which have different radio cover areas, said small radio base station controlling means managing the radio cover areas of the PDC portable terminal units, controlling connected to PDC portable terminal units through radio circuits and which have different radio cover areas, said small radio base station controlling means managing the radio cover areas of the PDC portable terminal units, controlling calls, and controlling and managing the radio circuits;
   a network-side adaptor selectively connectable to said audio processing means and used in non-audio communications with the PDC portable terminal units;
   PDC/network interface means for connecting to a private branch exchange through a plurality of communication paths;
   a time division switch for connecting said PDC/network interface, said audio processing means, said radio base station controlling means, and selectively connecting to said network-side adaptor and for switching the connection state thereof under the control of said small radio base station controlling means on time division basis.

2. A PDC communication controlling apparatus, comprising:
   audio processing means for converting a digital audio signal which has been encoded at a transmission rate of a personal digital cellular (PDC) into a digital audio signal at a transmission rate of a digital exchange network;
   small radio base station controlling means accommodating a plurality of small radio base stations which are connected to PDC portable terminal units through radio circuits and which have different radio cover areas, said small radio base station controlling means managing the radio cover areas of the PDC portable terminal units, controlling calls, and controlling and managing the radio circuits;
   a network-side adaptor used in non-audio communications with the PDC portable terminal units;
   PDC/network interface means connected to a private branch exchange through a plurality of communication paths;
   a time division switch for connecting said PDC/network interface, said audio processing means, said radio base station controlling means, and said network-side adaptor and for switching the connection state thereof under the control of said small radio base station controlling means on time division basis,
   wherein said small radio base station controlling means separates said PDC/network interface means from said network-side adaptor in the case which a termination call is an audio communication, places said network-side adaptor between said PDC/network interface means and said audio processing means in the case which the termination call is a non-audio communication, and loops back the communication path for an extension communication in the case which the termination call is a communication performed between the PDC portable terminal units.

3. A PDC communication controlling apparatus, comprising:
   a plurality of small radio base stations having different radio cover areas, the small radio base stations having audio processing means for converting a digital audio signal which has been encoded at a transmission rate of a personal digital cellular (PDC) into a digital audio signal at a transmission rate of a digital exchange network;
   small radio base station controlling means, connected to said small radio base stations, for managing the radio cover areas of PDC portable terminal units, controlling calls, and controlling and managing the radio circuits;
   a network-side adaptor selectively connectable during communications to said small radio base controlling means and used in non-audio communications with the PDC portable terminal units;
   PDC/network interface means for connecting to a private branch exchange through a plurality of communication paths; and
   a time division switch for connecting said PDC/network interface, said small radio base station controlling means, and said network-side adaptor and for switching the connection state thereof under the control of said small radio base station controlling means on time division basis.

4. A PDC communication controlling apparatus, comprising:
   a plurality of small radio base stations having different radio cover areas, the small radio base stations having audio processing means for converting a digital audio signal which has been encoded at a transmission rate of a personal digital cellular (PDC) into a digital audio signal at a transmission rate of a digital exchange network;

small radio base station controlling means, connected to said small radio base stations, for managing the radio cover areas of PDC portable terminal units, controlling calls, and controlling and managing the radio circuits;

a network-side adaptor used in non-audio communications with the PDC portable terminal units;

PDC/network interface means connected to a private branch exchange through a plurality of communication paths;

a time division switch for connecting said PDC/network interface, said small radio base station controlling means, and said network-side adaptor and for switching the connection state thereof under the control of said small radio base station controlling means on time division basis, wherein said small radio base station controlling means separates said PDC/network interface means from said network-side adaptor in the case in which a termination call is an audio communication, places said network-side adaptor between said PDC/network interface means and said small radio base station controlling means in the case which the termination call is a non-audio communication, and loops back the communication path for an extension communication in the case which the termination call is a communication performed between the PDC portable terminal units.

5. A communication controlling system having a PDC communication controlling apparatus which communicates with PDC portable terminal units through radio circuits and a private branch exchange (PBX), wherein said private branch exchange connects a plurality of PDC communication controlling apparatuses and is connected to an external public telephone network, and wherein each of the PDC communication controlling apparatuses comprises:

audio processing means for converting a digital audio signal which has been encoded at a transmission rate of a personal digital cellular (PDC) into a digital audio signal at a transmission rate of a digital exchange network;

small radio base station controlling means accommodating a plurality of small radio base stations which are connected to PDC portable terminal units through radio circuits and which have different radio cover areas, the small radio base station controlling means managing the radio cover areas of the PDC portable terminal units, controlling calls, and controlling and managing the radio circuits;

a network-side adaptor used in non-audio communications with the PDC portable terminal units;

PDC/network interface means connected to a private branch exchange through a plurality of communication paths;

a time division switch for connecting the PDC/network interface, the audio processing means, the radio base station controlling means, and the network-side adaptor and for switching the connection state thereof under the control of the small radio base station controlling means on time division basis, wherein the small radio base station controlling means separates the PDC/network interface means from the network-side adaptor in the case which a termination call is an audio communication, places the network-side adaptor between the PDC/network interface means and the audio processing means in the case which the termination call is a non-audio communication, and loops back the communication path for an extension communication in the case which the termination call is a communication performed between the PDC portable terminal units.

6. The communication controlling system as set forth in claim 5, wherein the time division switch has n time slots (where n is any integer larger than 1), one time slot being used for a control channel for transmitting/receiving control signals for controlling a communication performed between the PDC communication controlling apparatuses and the PDC portable terminals, the other time slots being used for data channels for transmitting/receiving signals between the PDC portable terminal units and the private branch exchange.

* * * * *